July 23, 1968   E. O. PETERSON ET AL   3,393,429
APPARATUS FOR APPLYING STIFFENING MATERIAL TO SHOE PARTS
Filed May 25, 1966   3 Sheets-Sheet 1

INVENTORS
Robert B. Dunlap
Evald O. Peterson
by _____ Atty

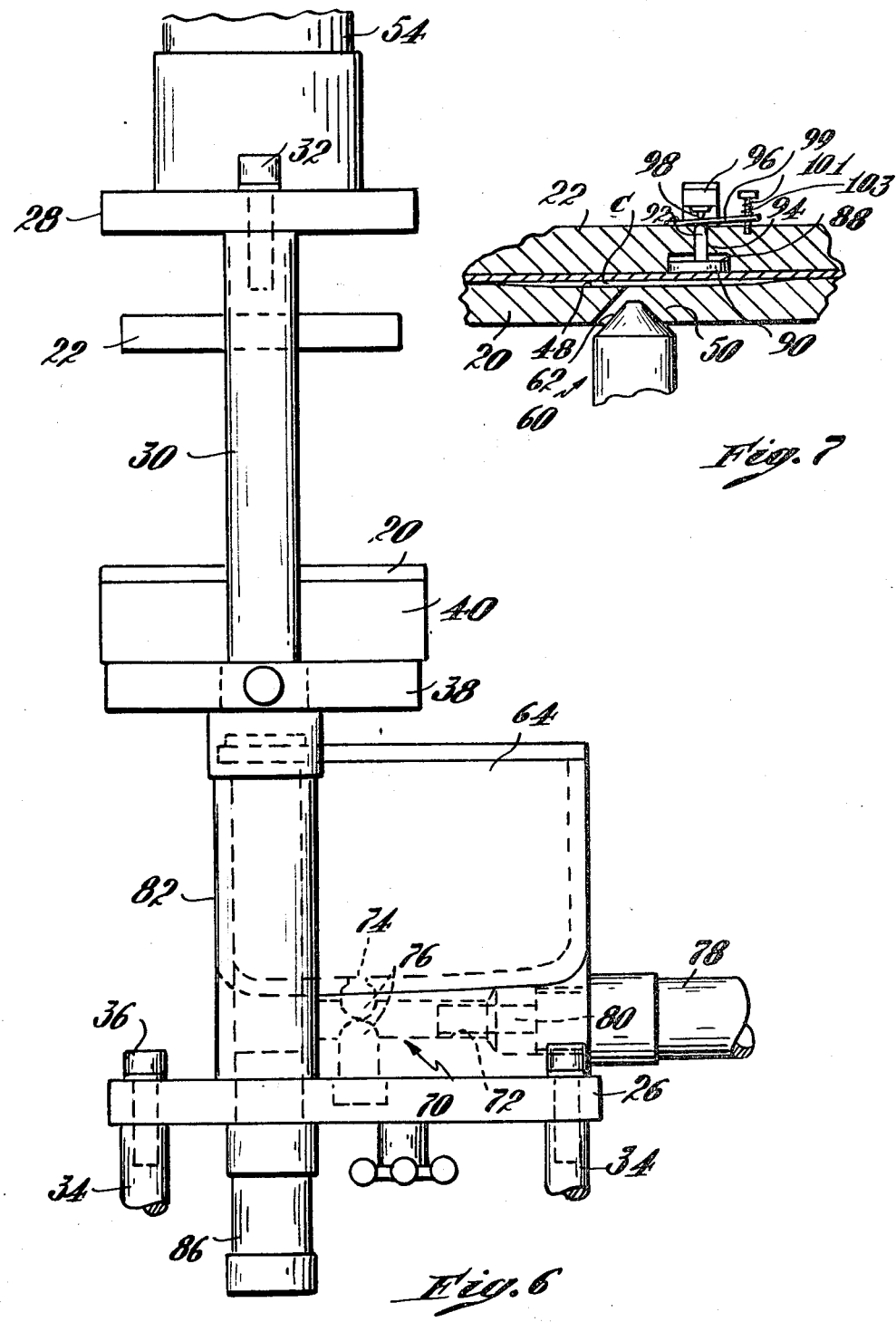

United States Patent Office 3,393,429
Patented July 23, 1968

3,393,429
APPARATUS FOR APPLYING STIFFENING
MATERIAL TO SHOE PARTS
Evald O. Peterson, Lynnfield Center, and Robert B.
Dunlap, Medway, Mass., assignors to Compo Shoe
Machinery Corporation, Waltham, Mass., a corporation of Delaware
Filed May 25, 1966, Ser. No. 552,921
14 Claims. (Cl. 18—30)

ABSTRACT OF THE DISCLOSURE

An apparatus for applying a stiffenable material to a shoe part having a pair of mold parts with flat confronting faces supported in spaced parallel relation for movement relative to each other. One of the parts contains a shallow cavity and an opening through which liquid material is injected into the cavity and against the shoe part supported by the other mold part. An injection nozzle is supported in spaced relation to the opening and a means is provided for effecting movement of the mold parts relative to each other and to the nozzle to clamp the shoe part between the mold parts, to press the nozzle into engagement with the opening, and concomitantly to effect injection of the liquid material into the cavity.

---

Apparatus for applying a potentially moldable and stiffenable material to shoe parts which can subsequently be activated in conjunction with molding apparatus to become stiff and resistant to flexure to impart a permanent set to the shoe part is not new.

The principal objects of this invention are to provide an improved apparatus of the foregoing kind and in particular to provide an apparatus for applying the material within a sharply defined, specifically restricted area; to provide for applying the material without displacement of the shoe part to which the material is applied relative to the material marginally thereof; to provide an apparatus for applying the material in liquid form either cold or hot and to effecting deposition of the liquid in the form of a solid layer of potentially activatable stiffener; to provide apparatus with improved means for automatically effecting injection and of terminating injection; to provide means which does not require an excessive amount of pressure; and to provide means which is reliable and efficient in operation.

As herein illustrated, the apparatus comprises a pair of mold parts having flat confronting faces supported in spaced parallel relation for movement relative to each other. One of the parts contains in its confronting face a shallow cavity corresponding in area to the area of the shoe part to which the moldable material is to be applied, and an injection opening through it through which the material in liquid form is injectable into the mold cavity against the shoe part supported by the other mold part. An injection nozzle is supported in spaced relation to the injection opening in the one mold part and there is means for effecting movement of the mold parts relative to each other and to the nozzle to clamp the shoe part between the confronting faces of the mold parts, press the nozzle into engagement with the injection opening, and concomitantly with the engagement of the nozzle with the injection opening effect injection of the material in liquid form into the mold cavity to fill the latter. The nozzle is supported in a fixed position relative to the mold parts and in alignment with the injection opening in the one part, and there is yieldable means normally supporting the one mold part in spaced relation to the discharge end of the nozzle. The injection opening in the one mold part and the discharge end of the nozzle are interengageable and so shaped that the terminal end of the nozzle, when engaged with the injection opening, is flush with the interior surface of the mold part. A heated platen supports the one mold part, is movable therewith relative to the nozzle and contains a hole within which the nozzle is situated without contact therewith. The nozzle is supported within a receptable and the material in liquid form is supplied to the nozzle by a pump, operation of the latter being effected automatically concomitantly with the movement of the one mold part into engagement with the nozzle. A sensing device is supported in the other mold part flush with the interior surface thereof and is operable by pressure of the shoe part against it when the mold cavity becomes filled to terminate injection. The mold parts, heated platen, nozzle and receptacle are supported by a rigid frame comprising vertically spaced plates connected by means of spaced parallel posts and by an adjustable plate mounted on the posts intermediate the upper and lower plates, the latter containing an opening through which the nozzle supported on the lower plate projects for engagement with the opening in the one mold part. The upper mold part is supported from the upper plate at the lower end of a rod protruding from a motor cylinder mounted on the upper plate.

The invention will now be described in greater detail with reference to the accompanying drawings wherein:

FIG. 5 is an elevation of the machine with part of the supporting base omitted and a part of the upper mold part motor omitted;

FIG. 7 is a vertical fragmentary section through the mold parts with a shoe part therebetween showing the injection nozzle and the sensing switch.

Figures 1, 2, 3:
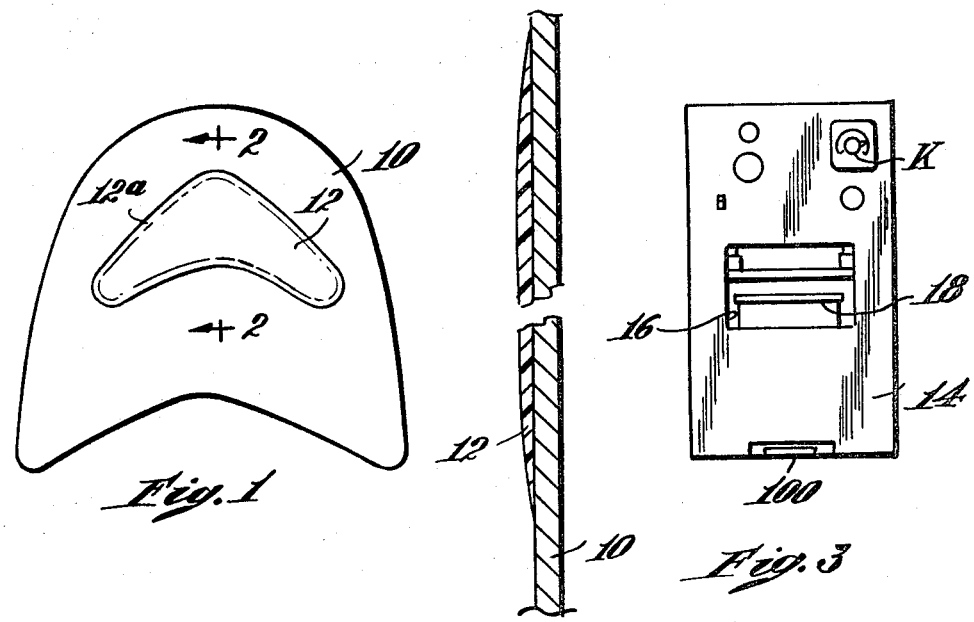
FIG. 1 is a plan view of a shoe part to which a potentially stiffenable material is applied in accordance with this invention.
FIG. 2 is a section taken on the line 2—2 of FIG. 1.
FIG. 3 is a front elevation, to very much smaller scale, of the machine, showing a work-supporting platform and the opening through which the work is inserted for application of the potentially stiffenable material thereto.

The invention is concerned with providing a machine for applying a potentially stiffenable material to a shoe part 10, for example to the inside of the forepart of an upper, herein illustrated in FIG. 1 as a vamp piece. The potentially stiffenable material 12 is applied thereto substantially in the configuration shown in FIG. 1 and it is desirable to apply it in such fashion that it is printed on the flesh surface without displacing the upper material itself out of its normal plane. Additionally, it is desirable that the marginal edge 12a of the material applied to the shoe part diminish in thickness so that it substantially blends with the surface thereby avoiding any apparent mark on the finished side of the upper which would detract from the appearance of the shoe.

The apparatus for printing the material on the shoe part is shown in elevation to very small scale in FIG. 3 and comprises a frame having a face panel 14 of substantially rectangular configuration containing an opening 16 to the interior within which there is mounted a horizontal platform 18 upon which a stack of the parts may be placed preparatory to inserting them into the machine for the printing operation.

Figure 6:
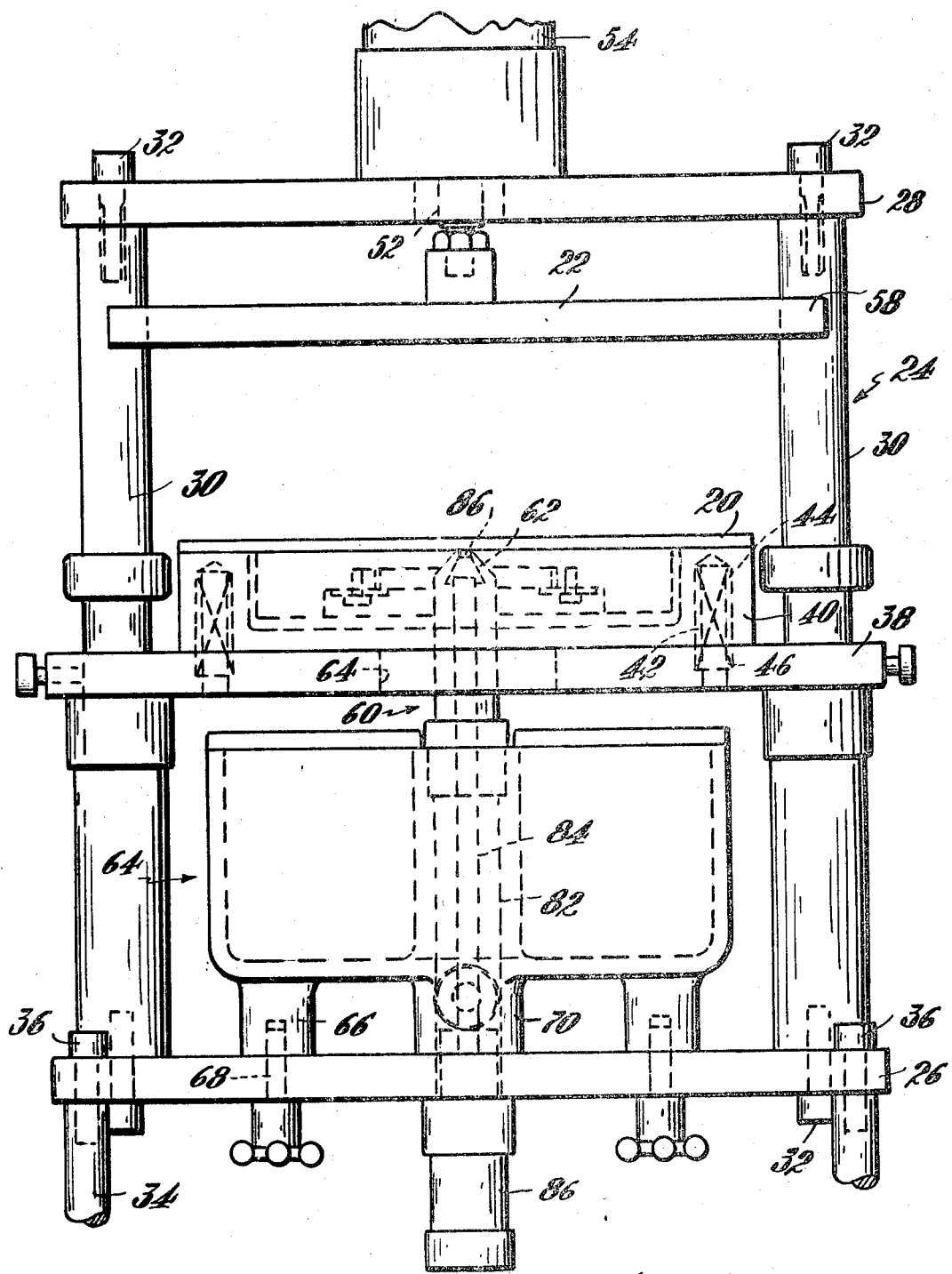
FIG. 6 is an elevation taken from the right-hand side of FIG. 5.

The printing of the stiffening material onto the shoe part is accomplished by means of a pair of mold parts 20 and 22 (FIG. 5) supported in spaced parallel relation to each other on a frame 24. The frame 24 comprises spaced parallel plates 26 and 28 rigidly connected in spaced parallel relation by a pair of transversely spaced, parallel posts 30 to the opposite ends of which the plates are fastened by bolts 32. The frame is supported from the floor by suitable leg members 34 fastened to the lower plate 26 by bolts 36. Between the plates 26 and 28 there is an adjustable plate 38. The lower mold part 20 is mounted on the adjustable plate 38 and is supported thereon by a platen 40 which contains heating elements for heating the mold part 20. The heating elements are $r$, $r1$ shown diagrammatically in the electrical diagram of FIG. 4 but are not shown in FIGS. 5 and 6 since such means is of conventional design. The platen 40 is in turn supported on the adjustable plate 38 by coiled springs 42 mounted within aligned holes 44 and 46 in the platen 40 and the pltae 38, so that the platen 40 and the mold part 20 are held yieldably elevated from the surface of the adjustable plate 38 and are depressible in unison by application of pressure to the upper side of the mold part 20.

The mold part 20 (FIG. 7) contains a shallow recess 48 corresponding in configuration to that shown in FIG. 1, although it is to be understood that it could have a different configuration and an injection opening 50 through the part from the bottom side into the recess. The injection opening 50 is tapered for a reason which will appear hereinafter.

The mold part 22 has a flat lower surface and is mounted on the lower end of a piston rod 52 (FIG. 5) which extends downwardly from a spring return motor cylinder 54 mounted on the plate 28. By supplying fluid pressure to the motor cylinder 54 the mold part 22 may be lowered into engagement with the mold part 20, as shown in FIG. 7, to form therewith a cavity $c$ corresponding in configuration and depth to the recess in the mold part 20. The platen is guided by bushings 58 at opposite ends which slidably engage the posts 30.

The part 10 to which the moldable material is to be applied is placed in a flat condition on the mold part 20 so that the area to which the material is to be applied coincides with the recess therein and then the mold part 22 is lowered into engagement with the mold part 20 to form the closed mold cavity $c$ (FIG. 7), one side of which is constituted by the part 10 to which the material is to be applied which lies flat against the undersurface of the mold part 22 and the other part of which is constituted by the bottom of the recess 48 in the mold part 20.

Injection of the material into the mold cavity $c$ is provided for by a nozzle 60 (FIGS. 5 and 7) supported in an upright position with its upper conical end 62 in alignment with the injection opening 50 in the mold part 20 and spaced from the lower end thereof, so that normally the injection end of the nozzle does not have contact with the mold part 20. An opening 64 is provided in the adjustable plate 38 and an opening 66 is provided in the platen 40 through which the nozzle projects without having contact therewith. The injection opening 50 in the plate is conical as related above and is proportioned so that depression of the mold part 20 after the mold part 22 has been brought into engagement therewith to form a closed mold cavity, forces the mold part 20 downwardly to interengage the conical discharge end 62 of the nozzle with the injection opening 50 in the mold part 20 and such that when fully engaged the terminal end of the injection nozzle 62 is flush with the inner surface of the mold cavity, that is with the bottom of the recess 48. The mold part 20 is normally supported out of engagement with the injection nozzle so that the heat from the mold plate 20 and/or the platen 40 will not be transmitted to the nozzle and cause congealing of the stiffening material in the injection nozzle. Actually the mold part 20 is engaged with the nozzle only during the period of injection and setting of the injected material for as soon as the mold part 22 is raised to permit raising the finished part, the mold part 20 will be raised away from the injection nozzle and so will be held out of contact with the nozzle while the operator is removing the finished part and inserting the next part.

The injection nozzle 60 is supported below the adjustable plate 38 (FIG. 6) at one end of a receptacle 64 mounted on the lower plate 26 for holding a quantity of the material to be applied to the shoe part. The receptacle 64 is supported by legs 66 (FIG. 5) on the plate 26 and removably secured thereto by bolts 68 inserted through the plate 26 from the underside and screwed into the lower ends of the legs. At the bottom side of the receptacle there is a part 70 containing a horizontally disposed chamber 72 which is connected to the bottom of the receptacle 64 by a passage 74 containing ports to the chamber 72 in which are supported ball check valves 76. A fluid operable motor 78 containing a rod or ram 80 is mounted on the part 70 adjacent one end of the chamber 72, so that the ram is movable relative to the check valves 76. Movement of the ram toward the right (FIG. 6), will draw the material from the receptacle 64 into the chamber 72 and movement to the left will force the material in the chamber 72 from the right side of the check valves to the left side, simultaneously closing the check valves so that the material cannot flow back into the receptacle 64. The chamber 72 at its left end is connected to the lower end of the barrel of the injection nozzle which comprises a barrel 82 (FIG. 5) within which there is slidably mounted a valve rod 84. The upper end 86 of the valve rod 84 is conical so that it fits closely into the interior of the injection nozzle and the lower end is connected to a piston (not shown) situated in a fluid operable motor 86 secured to the underside of the plate 26. The motor 86 is operable to advance and retract the valve rod 84 alternately to close the nozzle and open it. The ram 80, as related, operates to force the stiffening material into the lower end of the barrel of the injection nozzle and to fill it around the valve rod 84, so that when the motor 86 operates to retract the valve rod 84 discharge will take place.

The apparatus is designed so that following engagement of the mold part 22 with the mold part 20 and depression of the latter into engagement with the injection nozzle, the motor 78 will be supplied with fluid pressure to force the ram 80 forwardly and simultaneously the motor 86 will be supplied with fluid pressure to retract the valve rod 84 whereupon the stiffening material will be forced through the nozzle 62 into the mold cavity $c$.

It is necessary to terminate injection as soon as the mold cavity is filled to prevent overflow, that is flow of the material beyond the prescribed area to which it is to be applied and accordingly the mold part 22 (FIG. 7) is provided with a sensing element in the form of a button 88 recessed into the surface of the mold part 22 so that its lower surface 90 is flush with the lower surface of the part 22. As illustrated, the recess is slightly deeper than the thickness of the button 88 and the latter has on it a stem 92 which projects through an opening 94 in the mold part to the upper side. A switch element 96 is supported on the mold part 22 in position such that its actuating element 98 is engaged with an adjustable arm 99 overlying the upper end of the stem 92 so that displacement of the button 88 by pressure of the shoe part against it, when the mold cavity becomes filled, displaces the stem 92 upwardly against the element 98 and actuates the switch 96, the latter in turn being operable to terminate injection. Preferably, the button 88 is located near the geometrical center of the area to which the material is to be applied and it is extremely sensitive since it is of relatively large area and is not influenced by the character of the material. A screw 101 and spring 103 provides for adjusting the pressure at which shut off will take place.

Figure 4:
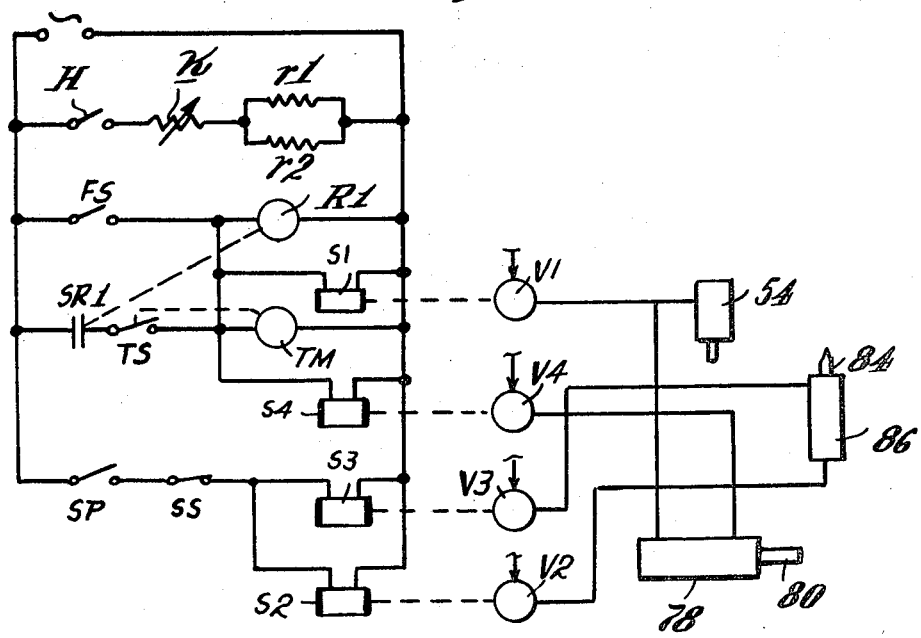
FIG. 4 is an electric and pneumatic control diagram for the machine.

Referring to FIG. 4 for operation of the machine there is shown a switch H for supplying current to heating coils $r1$, $r2$ controlled by a variable resistance $k$. The heating coils $r1$, $r2$ are located in the platen 40 and a knob K mounted on the face panel 14 provides for adjusting the variable resistance to obtain the right temperature for the material being used. When the temperature level for proper operation is reached, a foot switch FS is closed, for example, a treadle 100 at the base of the machine to energize a relay R1. Energization of relay R1 closes a switch SR1 which is normally open, thereby supplying current through a normally closed timer switch TS to a timing relay TM which provides a holding circuit for an adjustable predetermined time. Simultaneously, relay S1 is energized. Energization of relay S1 opens a valve V1 which supplies pressure to the upper end of the motor cylinder 54 thereby lowering the mold part 22 into engagement with the mold part 20. The valve V1 also supplies fluid pressure to the motor 78 in a direction to advance the ram 80 therein to force the material in the chamber 72 into the barrel of the injection nozzle. Relay S4 is de-energized at this time and hence valve V4 vents the forward end of the motor cylinder 78. When the mold part 22 engages the mold part 20 and the mold parts are moved downwardly into engagement with the platen 40, normally open platen switch SP is closed which supplies current through a normally closed sensing switch SS and normally closed relay S2 which energizes a valve V2 to exhaust the lower end of the motor cylinder 86 and energizes the relay S3 to shift the valve V3 in a direction to supply pressure fluid to the upper end of the motor cylinder 86 and hence retract the valve rod 84 so that injection takes place. As soon as the mold cavity is filled, the sensing switch SS shown in FIG. 7 at 96 will be opened by pressure of the material within the cavity against the button 88. Opening the sensing switch SS actuates the relays S2 and S3 so that the flow of fluid pressure to the motor cylinder 86 is reversed and the valve rod 84 is closed, thereby terminating injection. Following termination of injection the timer TM will run out at the termination of the time set for the particular material being employed and will then open the timing switch which will in turn actuate the relays S1 and S4. Actuation of relay S1 exhausts fluid pressure from the motor cylinder 54 so that the mold part 22 is raised by the spring pressure within the motor cylinder and actuation of relay S4 supplies fluid pressure by way of the valve V4 to the opposite end of the motor cylinder 78 so as to retract the ram 80. This completes the operation.

The preferred material employed for stiffening is heat-hardenable polyvinyl chloride in the homopolymer or copolymer group suspended in a plasticized vehicle together with stabilizers and coloring matter. The vehicle may be modified by the presence of organic solvent material to vary the rheological properties of the fluid. Organisols as well as plastisols may be used as a vehicle. When heated the mixture passes through a gel state into a plastic film which then becomes a homogeneous layer. As such it is heat softenable but will not flow until a temperature of about 400° F. is reached. The plastic film formed is particularly desirable as a stiffener when applied in the manner described above because it forms a discrete layer which stretches with the material of the shoe part when the latter is subjected to a molding operation so that it remains coextensive with the original area to which it was applied and in contrast to many stiffening materials heretofore employed, does not become absorbed into the surface of the shoe part during the molding operation and hence lose its identity as a stiffening layer but in contrast retains its homogeneity as a discrete layer adhered to the shoe part thus imparting shape-retaining properties to the shoe part without modifying the shoe part itself.

It should be understood that the present disclosure is for the purpose of illustration only and that this invention includes all modifications and equivalents which fall within the scope of the appended claims.

We claim:

1. Apparatus for applying a potentially moldable material to a predetermined area of a shoe part comprising a pair of mold parts having flat confronting faces supported in spaced parallel relation for movement relative to each other, one of said parts containing in its confronting face a shallow cavity corresponding in area to the area of the shoe part to which the moldable material is to be applied, said one part containing an injection opening through it through which the material in liquid form is injected into the cavity into contact with the shoe supported against the other part, an injection nozzle supported in spaced relation to the injection opening, means for effecting relative movement of the mold parts relative to each other and to the nozzle to clamp the part between the confronting surfaces and to press the nozzle into engagement with the injection opening, and means operable concomitantly with engagement of the nozzle with the injection opening to effect injection of the material in liquid form into the mold cavity to fill the latter.

2. Apparatus according to claim 1, wherein the cavity corresponds in depth to the thickness of the layer to be applied.

3. Apparatus according to claim 1, wherein the cavity has a sloping portion marginally of its bottom which merges with the face of the mold part.

4. Apparatus according to claim 1, comprising means supporting the nozzle in fixed position with its discharge end in alignment with the injection opening the one mold part, and the mold parts for movement relative to each other to clamp the shoe part therebetween and in unison relative to the nozzle to engage the discharge end of the nozzle with the injection opening.

5. Apparatus according to claim 1, comprising yieldable means supporting the one mold part in spaced relation to the discharge end of the nozzle, said yieldable means permitting movement of the mold parts in unison when engaged to press the orifice opening and the discharge end of the nozzle into engagement, and when the mold parts are disengaged to restore said one mold part to its initially spaced position from the nozzle.

6. Apparatus according to claim 1, wherein said one mold part contains an opening adapted to receive the discharge end of the nozzle, and when the tip of the nozzle is seated in the opening is flush with the inner surface of the mold part.

7. Apparatus according to claim 1, wherein said one mold part contains a conical injection opening and the nozzle has a conical end adapted, when seated in said opening, to be flush with the interior surface of the mold part.

8. Apparatus according to claim 1, wherein the one mold part embodies one or more heating elements for heating the one mold part and the liquid material injected into the mold cavity while in contact with the shoe part supported between the mold parts.

9. Apparatus according to claim 1, comprising a receptacle, said nozzle being supported by the receptacle, a valve supported in the nozzle, said valve normally closing the discharge end of the nozzle, a pump in the receptacle operable to force the liquid material into the nozzle, and means operable substantially concomitantly with the engagement of the discharge end of the nozzle with the injection orifice to retract the valve rod and actuate the pump to force the liquid through the discharge end into the mold cavity.

10. Apparatus according to claim 1, comprising a receptacle, a chamber situated below the receptacle, a check valve connecting the receptacle with the chamber, means supporting the discharge nozzle in the receptacle with its discharge end extending therefrom and its opposite end extending through the bottom of the receptacle into the chamber at one side of the check valve means, and a ram situated in the chamber at the other side of the check valve operable to force the liquid material, drawn into the chamber during retraction, through the nozzle, and means for effecting retraction of the valve rod in the discharge nozzle concomitantly with the advance of the ram and to restore it to its closed position simultaneously with retraction of the ram.

11. Apparatus according to claim 1, comprising a sensing device supported in said other one of the mold parts flush with the interior surface thereof, said sensing device being operable by pressure of the shoe part against it to terminate injection.

12. Apparatus according to claim 11, comprising a timer operable at a predetermined time following operation of the sensing device to effect separation of the mold parts.

13. Apparatus according to claim 1, comprising a button recessed into said other one of the mold parts flush with its interior surface, said button being movable by pressure of the shoe part thereagainst when the mold cavity becomes filled to effect termination of injection.

14. Apparatus for applying a potentially moldable material to a predetermined area of a shoe part comprising a supporting frame embodying upper and lower plates, a pair of transversely spaced posts rigidly connecting the plates in spaced parallel relation, a vertically adjustable plate mounted on posts between the upper and lower plates, said adjustable plate containing a centrally located opening, a first mold part yieldably mounted on the adjustable plate over the opening, an injection device mounted on the lower plate beneath the adjustable plate, said injection device embodying a nozzle which extends upwardly through the opening in the adjustable plate into injecting relation with the injection opening in the first mold part, a second mold part supported on the frame between the upper plate and the adjustable plate, power-operable means operably connected to the second mold part for lowering the second mold part into engagement with a workpiece resting on the first mold part and for clamping the workpiece between said mold parts, and means operable by yielding movement of the first mold part, following engagement of the second mold part therewith, to initiate injection.

References Cited
UNITED STATES PATENTS

| | | | |
|---|---|---|---|
| 2,436,122 | 2/1948 | Rotsler | 18—30 |
| 3,189,946 | 6/1965 | Ciaio | 18—30 |
| 3,196,485 | 7/1965 | Battenfeld et al. | |
| 3,306,964 | 2/1967 | Miller | 18—30 |

FOREIGN PATENTS 1,386,508  12/1964  France.

WILBUR L. McBAY, *Primary Examiner.*